US012765520B2

(12) United States Patent
Corona

(10) Patent No.: US 12,765,520 B2
(45) Date of Patent: Oct. 20, 2026

(54) PET HARNESS WITH INTERCHANGEABLE ELEMENTS

(71) Applicant: Kimberly Corona, Van Nuys, CA (US)

(72) Inventor: Kimberly Corona, Van Nuys, CA (US)

( * ) Notice: Subject to any disclaimer, the term of this patent is extended or adjusted under 35 U.S.C. 154(b) by 0 days.

(21) Appl. No.: 18/920,021

(22) Filed: Oct. 18, 2024

(65) Prior Publication Data

US 2025/0127146 A1 Apr. 24, 2025

Related U.S. Application Data

(60) Provisional application No. 63/544,655, filed on Oct. 18, 2023.

(51) Int. Cl.
*A01K 27/00* (2006.01)

(52) U.S. Cl.
CPC .......... *A01K 27/008* (2013.01); *A01K 27/002* (2013.01); *A01K 27/006* (2013.01)

(58) Field of Classification Search
CPC .. A01K 27/008; A01K 27/002; A01K 13/006; A01K 13/008; A01K 13/00; A41D 15/04; A41D 2400/70; A41D 2400/72
See application file for complete search history.

(56) References Cited

U.S. PATENT DOCUMENTS

| | | | | |
|---|---|---|---|---|
| 6,318,054 | B1 * | 11/2001 | Gatto | A01K 13/008 54/79.3 |
| 6,571,745 | B2 | 6/2003 | Kerrigan | |
| 6,662,755 | B2 | 12/2003 | Kato | |
| 7,370,608 | B1 | 5/2008 | Friedman | |
| D699,403 | S | 2/2014 | Holterhaus et al. | |
| 9,901,074 | B2 * | 2/2018 | Mott | A01K 13/006 |
| 10,292,368 | B1 * | 5/2019 | Pierog | A01K 27/005 |
| 10,334,821 | B2 | 7/2019 | Yun | |
| 10,517,270 | B2 * | 12/2019 | Gilbert | A01K 13/008 |
| 10,624,314 | B2 | 4/2020 | Lui | |
| 10,736,305 | B2 | 8/2020 | Badr | |
| 2006/0249097 | A1 | 11/2006 | Goldberg | |
| 2009/0120377 | A1 * | 5/2009 | Palmer | A01K 27/002 119/856 |

(Continued)

FOREIGN PATENT DOCUMENTS

| | | | | |
|---|---|---|---|---|
| WO | 2020251547 | A1 | 12/2020 | |
| WO | WO-2021019381 | A1 * | 2/2021 | A01K 27/002 |
| WO | WO-2023168383 | A2 * | 9/2023 | A01K 27/008 |

OTHER PUBLICATIONS

"RSG Dog First Aid Kit," kurgo.com. https://www.kurgo.com/harnesses/rsg-dog-first-aid-kit [Date accessed: Sep. 6, 2023].

(Continued)

*Primary Examiner* — Kristen C Hayes
(74) *Attorney, Agent, or Firm* — Bold IP PLLC; Christopher Mayle

(57) ABSTRACT

A customizable system and method for a walking harness with easy attachments of zippered and snap button fashion trends such as printed clothing, color customization, and costumes, whereby the harness has an upper component and lower component that are connected by a series of buckles to fit over a pet, whereby the lower component has two layers including a base layer made of mesh-like material and a second layer connected to the base layer by snap buttons.

11 Claims, 10 Drawing Sheets

(56) References Cited

U.S. PATENT DOCUMENTS

| | | | | |
|---|---|---|---|---|
| 2010/0199927 | A1* | 8/2010 | Cigard | A01K 27/002 119/850 |
| 2013/0014705 | A1* | 1/2013 | Cho | A01K 27/006 119/863 |
| 2013/0276719 | A1 | 10/2013 | Ferrando | |
| 2017/0006834 | A1* | 1/2017 | Waters | A01K 27/002 |
| 2017/0049077 | A1 | 2/2017 | Ng | |
| 2017/0099807 | A1* | 4/2017 | Northrop | A01K 13/006 |
| 2018/0116175 | A1* | 5/2018 | Lui | A01K 27/001 |
| 2019/0297845 | A1* | 10/2019 | Gilbert | A01K 13/008 |
| 2020/0205379 | A1* | 7/2020 | Leek | A01K 13/006 |
| 2020/0245592 | A1 | 8/2020 | Wagner | |
| 2020/0404887 | A1* | 12/2020 | Akenhead | A01K 1/0263 |
| 2021/0022320 | A1* | 1/2021 | Allen | A01K 11/008 |
| 2021/0144967 | A1* | 5/2021 | Albakri | A45B 11/02 |
| 2022/0104460 | A1 | 4/2022 | Berlin et al. | |
| 2022/0167591 | A1* | 6/2022 | Sullivan, II | A01K 27/002 |
| 2022/0408891 | A1* | 12/2022 | Lin | A01K 27/008 |
| 2026/0090518 | A1* | 4/2026 | Becker | A01K 13/006 |

OTHER PUBLICATIONS

International Search Report received in corresponding PCT Application No. PCT/US2024/052054, dated Jan. 8, 2025 and consisting of 11 pages.

* cited by examiner

PET HARNESS WITH INTERCHANGEABLE ELEMENTS

CROSS REFERENCE TO RELATED APPLICATION

This application claims priority to U.S. Provisional Patent Application No. 63/544,655 filed on Oct. 18, 2023 and is incorporated in its entirety.

FIELD OF DISCLOSURE

The overall scope of this innovation pertains to pet harness, and more particularly to interchangeable pet harness apparel specifically designed to provide customization options for pet owners to enhance the appearance of their pets while maintaining comfort and security for active pets.

BACKGROUND

A pet harness is a piece of equipment designed to secure and control an animal, typically a dog or cat, during various activities. Unlike collars, which go around an animal's neck, harnesses distribute pressure more evenly across an animal's body, reducing the risk of injury, choking, or neck strain. Pet harnesses come in various styles and designs, but they typically consist of straps, buckles, and attachment points.

The desire of pet owners to stylishly attire their pets has driven the transformation of harnesses into fashionable pet ensembles and accessories. Unlike human clothing, which can be interchanged and combined with ease, pet owners typically need to remove pet harness from their pet and replace it with another in order to change their pet's outfit.

Some pet harnesses have removable attachments but can cause chafing or rubbing against the pet's skin, leading to discomfort or skin irritation. These harness attachments also have limited adjustability because of the connection points on the harness, making it challenging to achieve a secure and comfortable fit for pets of various sizes and shapes. Thus exists the need for a pet harness with interchangeable elements

SUMMARY

It is an object of the present description to provide a system and method for a dog harness adapted to receive various ornamental and costume attachments via zippered connections. The harness wraps around a dog and has a plurality of pockets as well as a D-ring for attachment to a leash. This pet harness provides fashionable attachments that are interchangeable. The harness base provides the security of a typical harness for active pets, while the interchangeable attachments provide an element of unique fashion, costumes, and utility. This pet harness has a multitude of attachments for multiple looks and purposes. In other embodiments, functional devices such a raincoat or first aid kit may also be attached to the harness.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
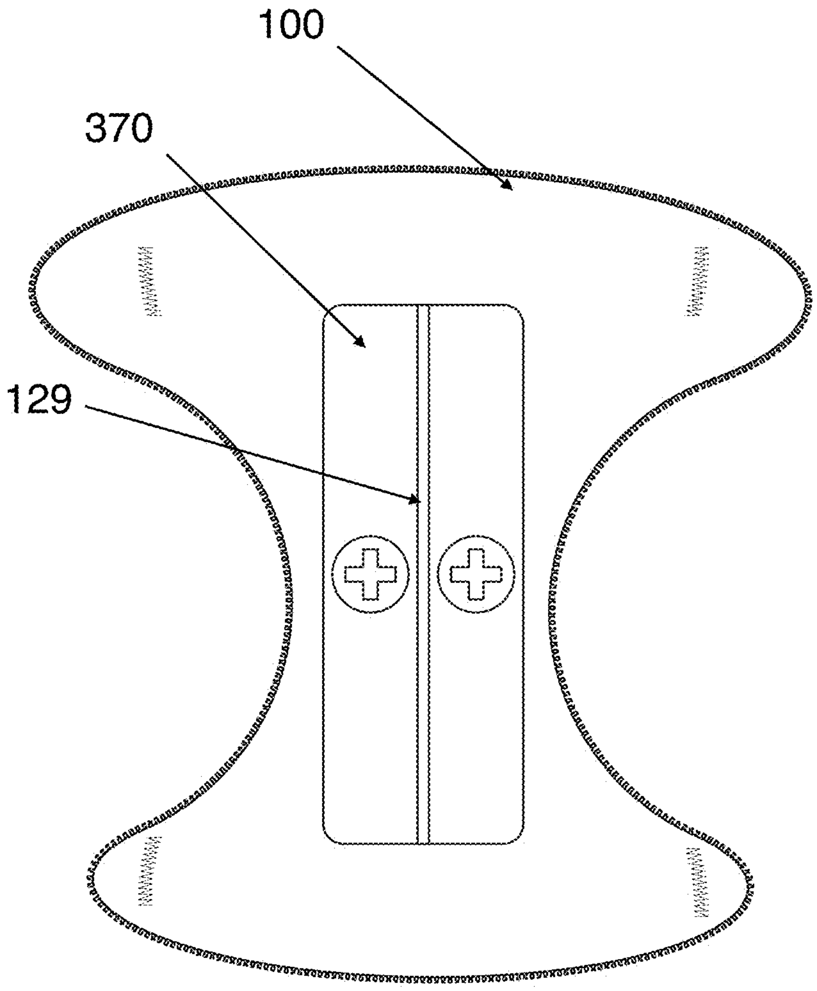
FIG. 1 shows an example of one embodiment of the harness and attachment with a first aid kit.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

In the following detailed description, numerous specific details are set forth in order to provide a more thorough understanding of the one or more embodiments described herein. However, it will be apparent to one of ordinary skills in the art that the invention may be practiced without these specific details. In other instances, well-known features have not been described in detail to avoid unnecessarily complicating the description.

The present invention is directed to an innovative dog harness system with attachable fashion and costumes comprising a harness unit and a range of interchangeable fashion elements and costumes. These attachments would allow dogs to dress up as different characters or assume roles, enabling them to engage in pretend professions, events, and activities alongside their human companions. The harness unit is designed with adjustable straps, secure fasteners, easy attachment of stylish harness covers, and comfortable fittings to ensure the well-being of the dog while being worn. The interchangeable fashion elements include a fashionable harness cover attachment with buttons, bows, and other ornaments that can be attached and removed easily. Additionally, a collection of themed costumes, such as superhero, pirate, and princess outfits, can be seamlessly integrated with the harness unit.

The harness unit is designed to securely fit around the dog's body while distributing pressure evenly to prevent discomfort. The adjustable straps allow for a customized fit, and the fasteners ensure the harness remains securely in place during use. The fashion elements are designed to be attached to the harness unit without compromising the integrity of the harness or causing discomfort to the dog. The attachment mechanism involves a snap and zippered mechanism, enabling easy attachment and removal of the fashion elements that fit to harness size. The costume collection offers a range of colorful designs, and themed outfits that can be seamlessly attached to the harness unit, allowing the dog to transform into various characters. These costumes are designed to integrate with the harness system, ensuring safety, comfort and style.

Referring to the FIGS. 5-10, embodiments of the pet harness system 100 are illustrated. Pet harness system 100 may include a layered coat system for animals such as a dog or cat which permits the animal owner the flexibility of customizing an animal coat for specific needs. Pet harness system 100 may be constructed of multi-layers of material that are connected together. For instance, pet harness system 100 may include an upper component 101 that is positioned above the animal while in use and a bottom component 102 that is positioned below the animal while in use. Upper component 101 and lower component 102 may have an hourglass or rectangular shape that extends across the length of the pet's body.

Upper component 101 and lower component 102 may be connected by a series of buckle straps 112 or other fastening mechanisms at four corner area quadrant regions to secure the pet safely. Buckle straps 112 may each have a strap having webbing or made of a flexible band made of materials such as but not limited to nylon, leather, or fabric as well as a buckle which is metal or plastic device with a frame and a prong or lever mechanism to removably connect a male component and female component together. In use, a pet may be comfortably positioned between upper component 101 and lower component 102 whereby buckle straps 112 may be tightened or loosened to properly secure the pet.

Figure 8:
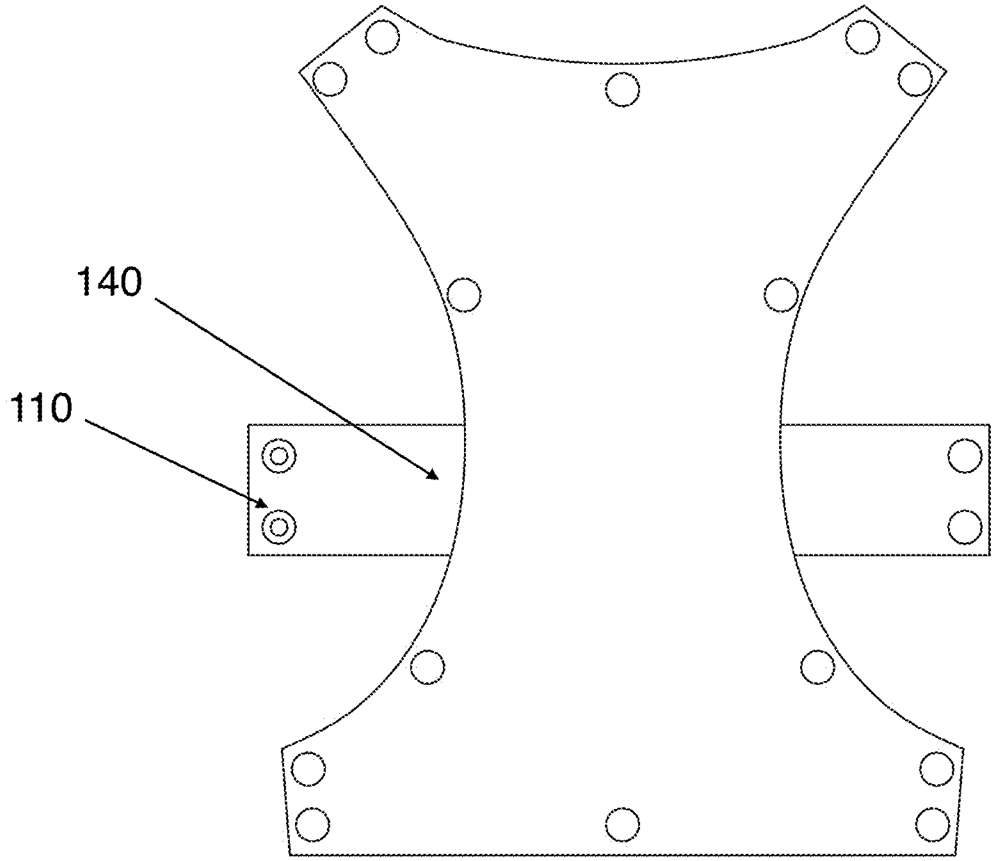
FIG. 8 shows a bottom component of a harness attachment with the flaps open.
Figure 9:
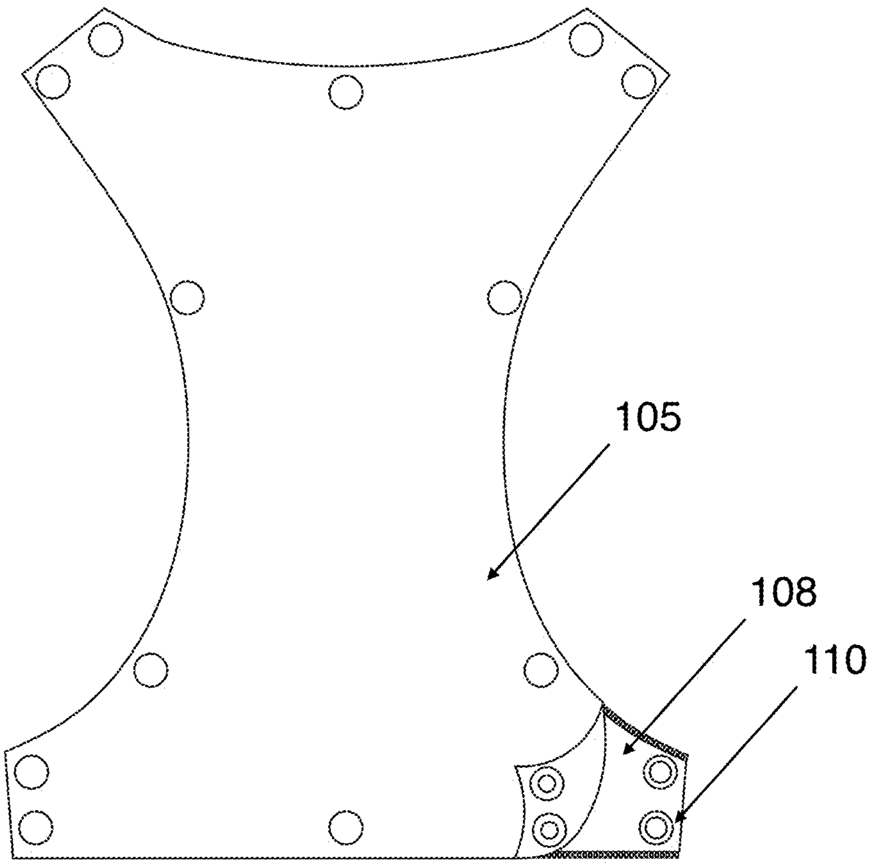
FIG. 9 shows the bottom component of the harness attachment in FIG. 8 with the flaps closed.

Lower component 102 may have one or more straps or flaps 140, as illustrated in FIGS. 8 and 9, designed to encircle a pet's body, with one portion fitting around the chest and another around the back of the pet below upper component 101. Flaps 140 may also have one or more buckles, clips, or Velcro closures that can be adjusted to ensure a snug and secure fit for the pet.

Lower component 102 may have a base layer 108 with mesh-like material that is positioned underneath the pet to provide for air-flow or circulation to keep the pet cool during hot weather. In one or more embodiments, the mesh-like material can be made of 100% polyester that is soft to the touch, lightweight, breathable, and comfortable.

Lower component 102 may have a second layer 105 directly or indirectly connected by snap buttons 110 and resting outward of base layer 108. Second layer 105 may provide warmth and/or protection for the pet and also functions as a harness for the animal or dog or may be used for fashion using faux suede or other materials. Second layer 105 may be made of sturdy material having sufficient elasticity to provide comfort and stretchability to enable the pet owner(s) to keep their pet(s) in control while the pet harness system maintains or retains its original form. The perimeter of second layer 105 may have binding or a strip of fabric or tape applied to the edge pet harness system 100.

Upper component 101 may have a top layer 109. Top layer 109 may be made of sturdy material having sufficient elasticity to provide comfort and stretchability to enable the pet owners to keep their pets in control while the pet harness system maintains or retains its original form.

Figure 10:
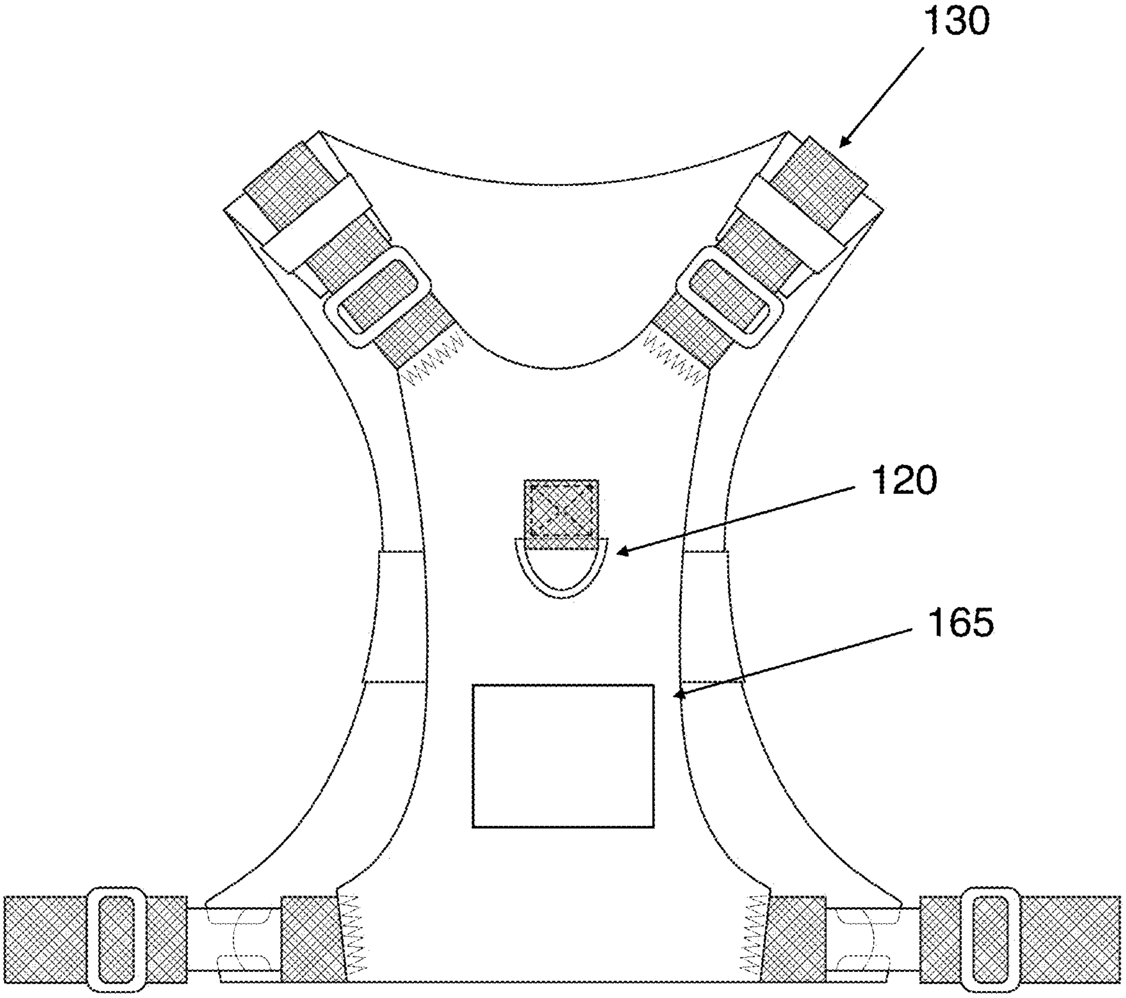
FIG. 10 shows the top component of the harness attachment in FIG. 8.

Top layer 109 may have one or more pockets 165, as illustrated in FIG. 10, on an upper surface allowing for the user to place one or more personal belongings or items. The pockets may also house a locator system for the pet using GPS or RFID or other technologies. The locator device may be connected to a remote computing device such as a phone, tablet, or computer. The user may access a user interface on the remote computing device in the form of a smartphone app or a website. Through this interface, the user may access real-time location data, set up safe zones or geofences, and receive alerts if the pet leaves or enters a predefined area.

Figure 2:
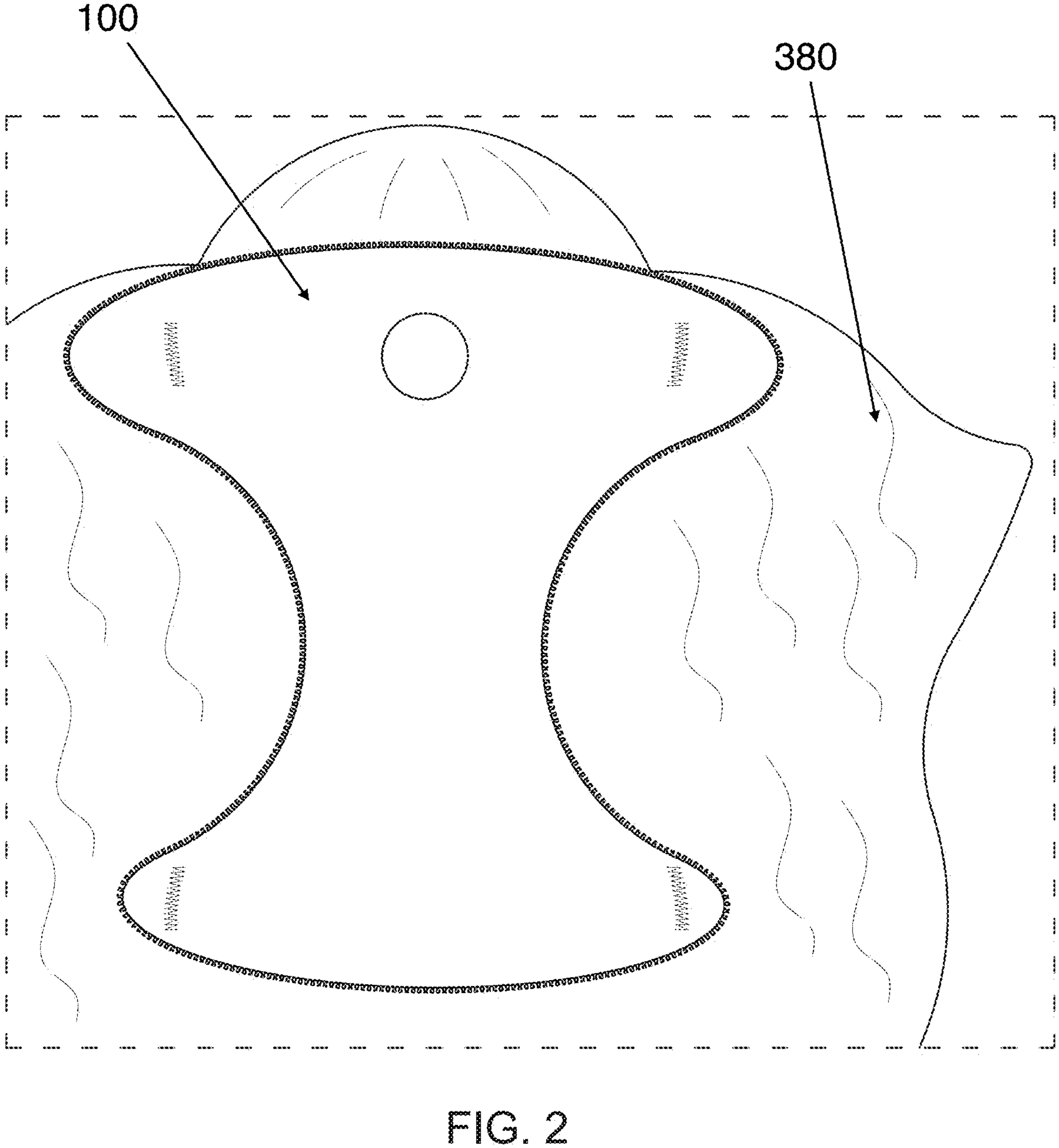
FIG. 2 shows another example of the harness and attachment with a dress.
Figure 3:
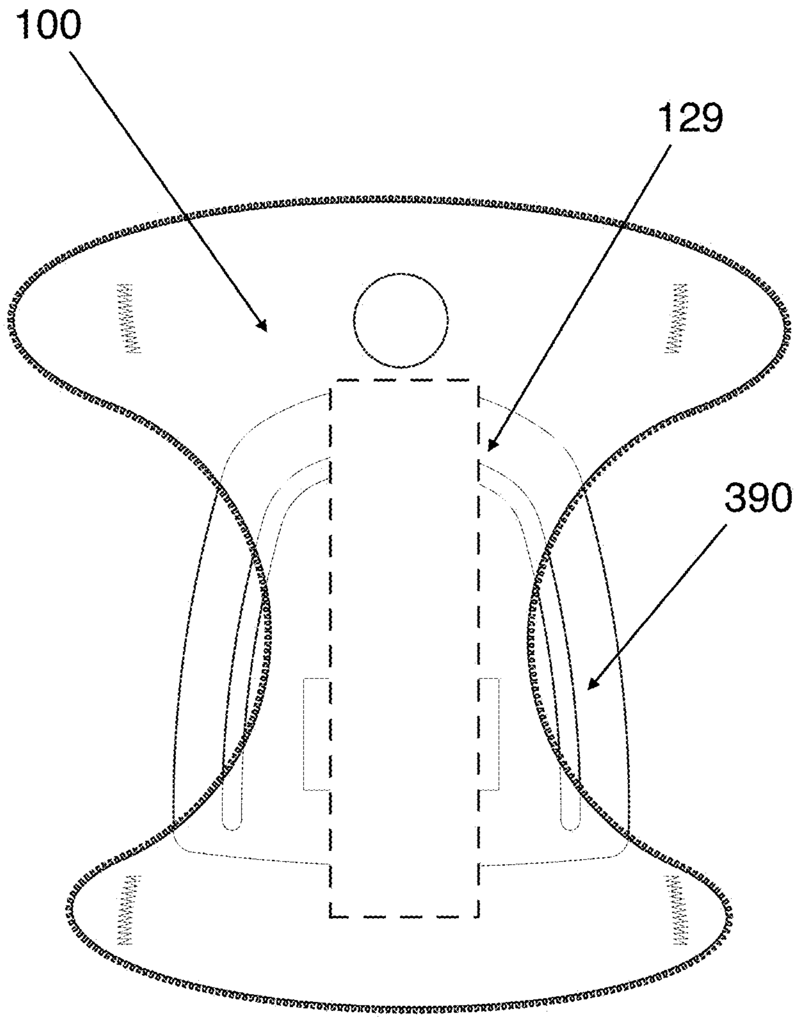
FIG. 3 shows another example of a harness attachment with a backpack.
Figure 4:
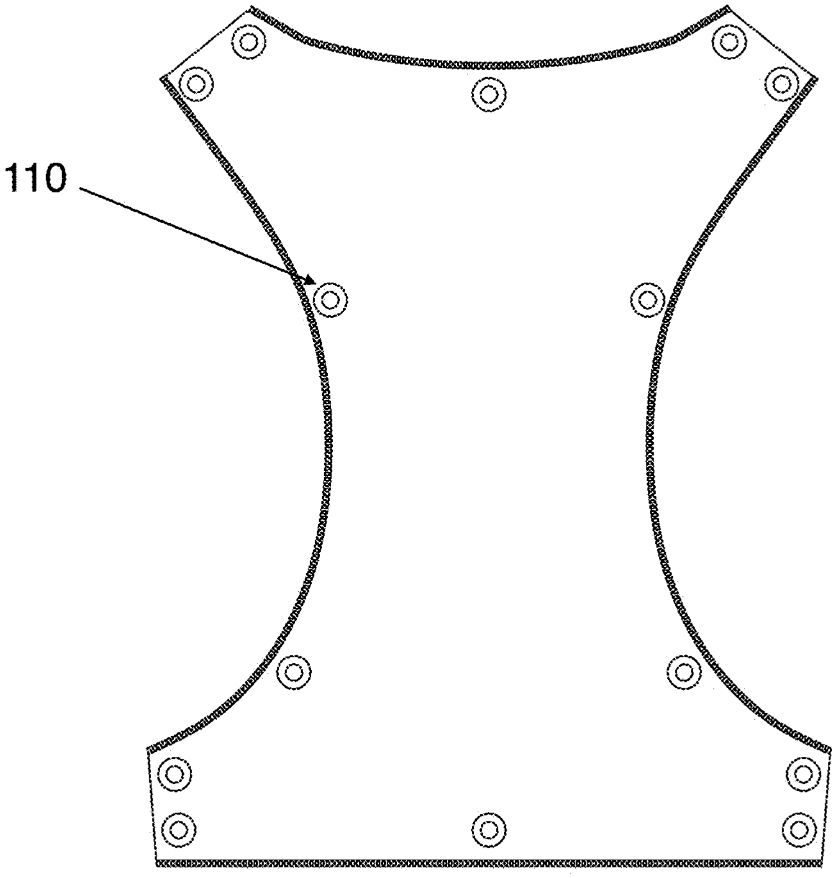
FIG. 4 shows a bottom component of a harness attachment.
Figure 5:
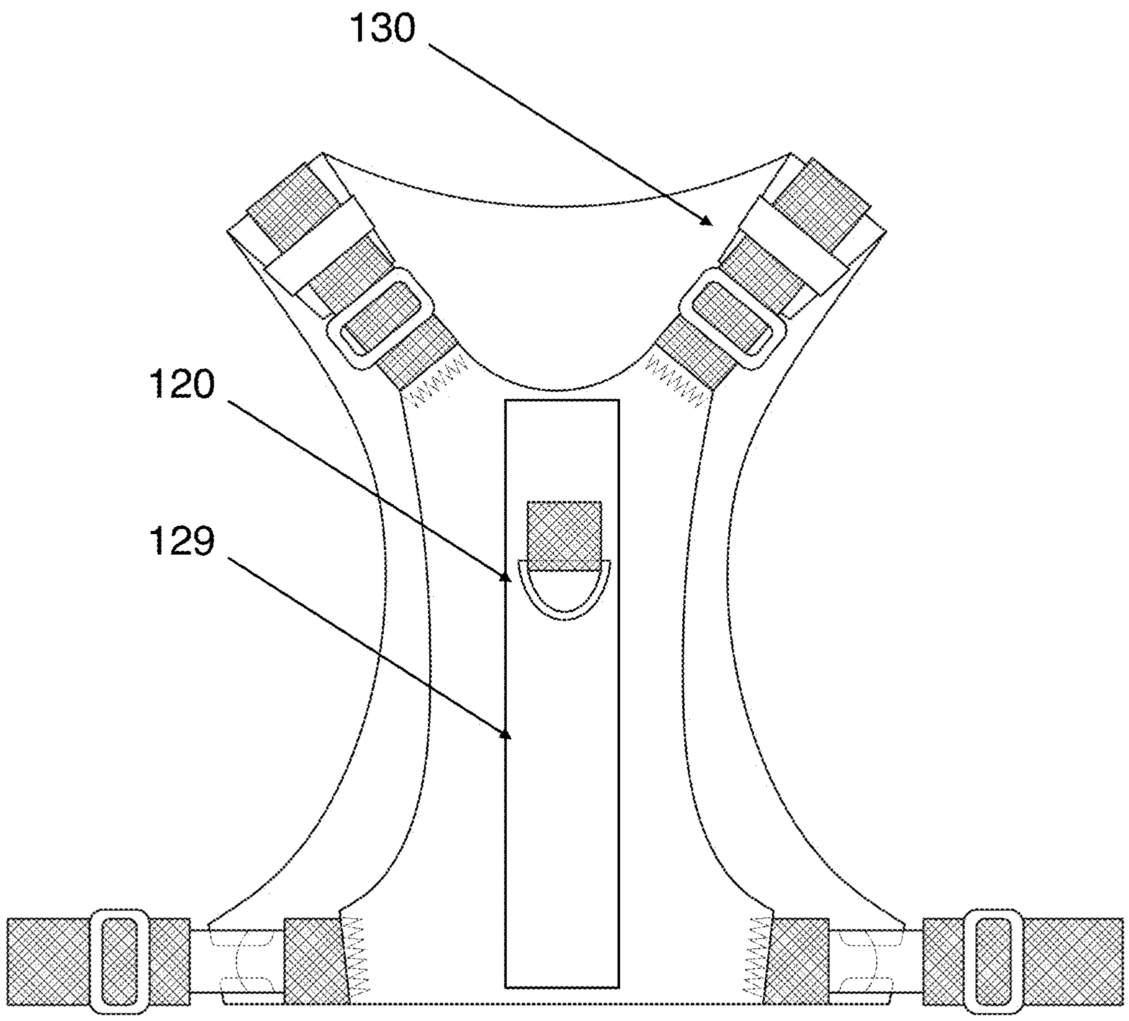
FIG. 5 shows top component of the harness attachment in FIG. 4.
Figure 6:
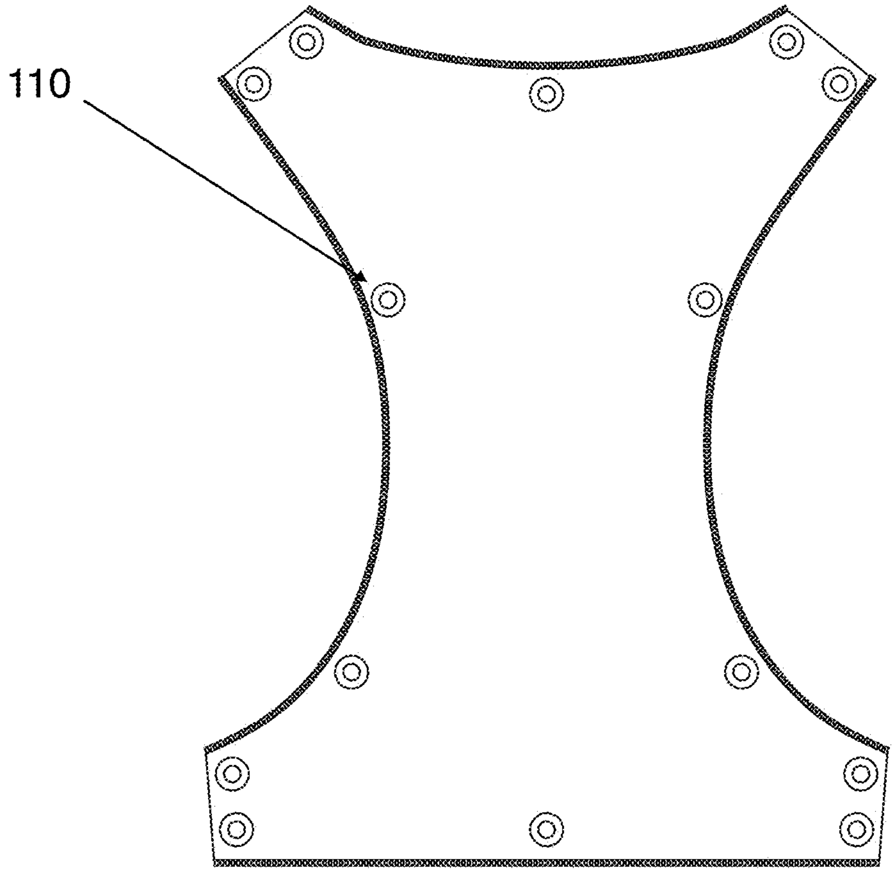
FIG. 6 shows a bottom component of a harness attachment.
Figure 7:
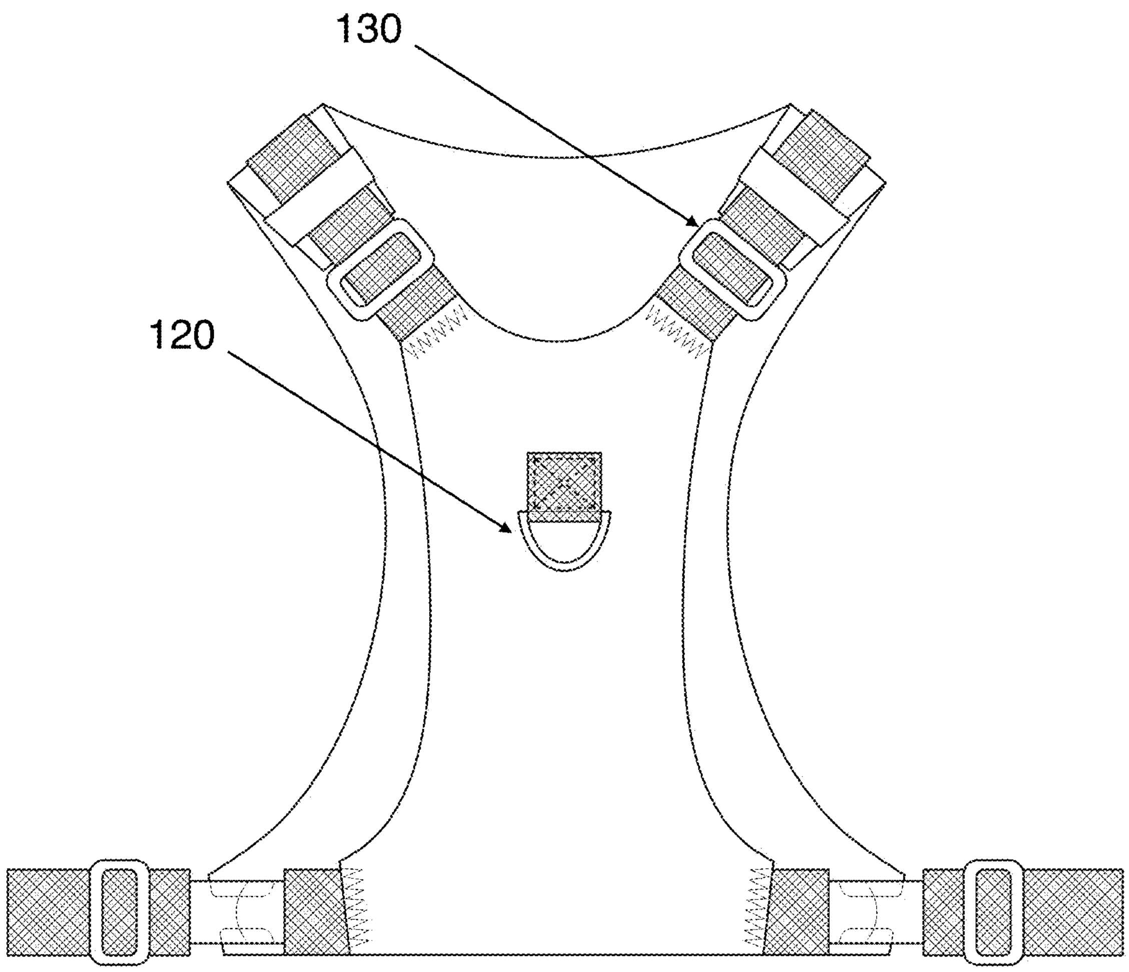
FIG. 7 shows top component of the harness attachment in FIG. 6.

Top layer 109 may have a series of attachment points for connecting to one or more accessories. Top layer 109 may have an elongated strip of a Velcro® type fastener 129 that goes along a center line of top layer 109 to connect various accessories such as a first aid kit 370, as illustrated in FIG. 1, a dress 380 as illustrated in FIG. 2, or a backpack 390 as illustrated in FIG. 3. Other non-limiting embodiments may also include a reflective sheet, a graphic tee, a rain poncho, or other designs depending on the need and circumstances.

In further embodiments, pet harness system 100 may have a zipper fastening mechanism along an outer perimeter of the base layer with long strips of fabric tape having a row of teeth or coils running along its length that may be connected to accessories with a corresponding fabric tape that may be interlocked by a slider when the accessories and the harness are attached.

Top layer 109 may have a D-ring 120 positioned on the upper surface, connected by a strap, or through a hole at a center of the top layer 109. D-ring 120 may be made of metal and positioned over the Velcro® type fastener whereby D-ring 120 may be used to connect pet harness system 100 to a leash or other device. D-ring 120 may be connected by bartack reinforced stitching using a series of close, dense stitches sewn in a short rectangular or oval shape. A second D-ring may be positioned on the underside of the harness. The positing of the Velcro® type fastener, the button holes, the zipper fastening mechanism, and the D-ring provide a comfortable, adjustable harness, that reduces stress placed on the animal's neck and other areas.

To use pet harness system, the user may place the harness over the pet's head or have them step into it. Once the harness is on the pet, the user may secure it using the straps. The user may then attach the accessory using the Velcro and zipper. The user may then attach a leash to the designated D-ring on the harness.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

The invention claimed is:

1. A pet harness system comprising:

an upper component positioned above a pet;

a lower component positioned below the pet;

a plurality of straps connecting the upper component and the lower component at four area corner quadrants of the upper component and the lower component; and at least one attachment mechanism on a top side of the upper component facing vertically upward with respect to a ground surface for securing one or more interchangeable accessories by a compatible attachment mechanism on the one or more interchangeable accessories, wherein the at least one attachment mechanism comprises an elongated strip of hook-and-loop fastener along a center line of the upper component, the elongated strip positioned rearward of a ring attached to the upper component for connecting a leash, wherein the upper component and the lower component each have an hourglass shape that extends over a length of the pet.

2. The pet harness system of claim 1 further comprising: wherein the plurality of straps have webbing or are made of a flexible band.

3. The pet harness system of claim 1, wherein the upper component comprises one or more pockets on its upper surface.

4. The pet harness system of claim 3, wherein the one or more pockets houses a locator system for the pet.

5. The pet harness system of claim 1, wherein the lower component comprises one or more flaps at a middle of the center line designed to encircle a body of the pet, with one portion of the one or more flaps fitting around a chest of the pet and another portion of the one or more flaps fitting around a back of the pet below the upper component.

6. The pet harness system of claim 1, further comprising at least one interchangeable accessory.

7. The pet harness system of claim 6, wherein the at least one interchangeable accessory is a first aid kit.

8. The pet harness system of claim 6, wherein the at least one interchangeable accessory is a dress.

9. The pet harness system of claim 6, wherein the at least one interchangeable accessory is a backpack.

10. The pet harness system of claim 1 wherein the ring is attached to the upper component using bartack reinforced stitching.

11. A pet harness system comprising:

an upper component configured to be positioned above a pet;

a lower component configured to be positioned below the pet; and a plurality of buckle straps connecting the upper component and the lower component, wherein the lower component comprises: a base layer made of mesh-like material; and a second layer connected to the base layer by snap buttons.

* * * * *